Patented Sept. 10, 1940

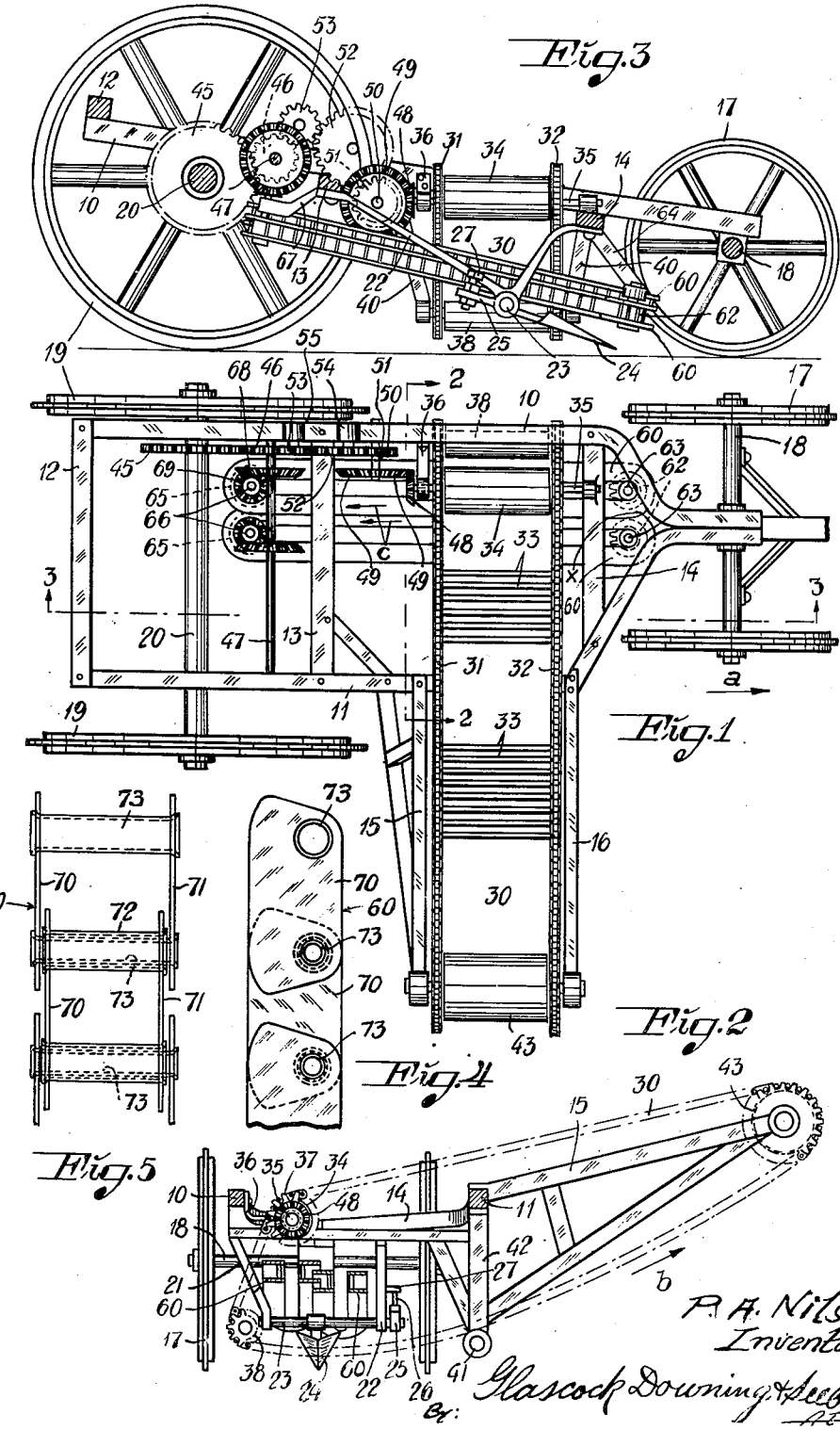

2,214,174

UNITED STATES PATENT OFFICE 2,214,174

POTATO HARVESTER

Per Anton Nilsson, Viby, Sweden, assignor of one-half to Olof Almér, Kristianstad, Sweden Application December 28, 1938, Serial No. 248,095
In Sweden November 27, 1935

2 Claims. (Cl. 55—66)

The present invention relates to machines for harvesting vegetables and particularly potatoes.

The principal object of the invention is to provide a simple and practical machine of this character which has improved means for gripping the foliage of the potato stands, pulling and elevating the stand together with its potatoes and any soil adhering thereto, firmly holding the foliage while the potatoes are removed from the stand and carrying the foliage out of the machine.

Another object of the invention is to provide a machine of the class described in which the pulling and elevating mechanism comprises one or more pairs of flexible endless belts such as chains or the like arranged side by side and slanting forwardly of the machine, the belts of each pair engaging each other along a portion of their length by longitudinal lists or ribs on the one belt projecting into the interspace between similar lists or ribs on the other belt. By these lists the foliage entering the line of engagement of the belts is bent into zigzag or undulatory shape so as to be effectively gripped by the belts and firmly kept in clamped position while the stand is stripped of its potatoes.

With these and further objects in view the invention consists of the novel features of construction and the combination and arrangement of parts hereinafter fully described and illustrated in the accompanying drawing, in which—

Fig. 1 is a plan view of the improved potato harvester, certain parts being omitted for the sake of better illustration;

Figs. 2 and 3 are vertical sectional views along the lines 2—2 and 3—3 in Fig. 1, respectively;

Fig. 4 is a lateral view and Fig. 5 a top view on an enlarged scale of part of a chain of the improved pulling and elevating mechanism.

The frame of the machine is composed of longitudinal side beams 10, 11, cross beams 12, 13 and 14 and an arm of parallel beams 15, 16 and necessary strengthening stays extending from side beam 11 obliquely outwards and upwards transversely of the frame. The frame is mounted on fore wheels 17 carried by a shaft 18 and rear wheels 19 carried by a shaft 20.

Mounted on cross beams 13, 14 at each side of the frame is a downwardly extending bracket 21 and 22, respectively, and mounted in said brackets is a horizontal shaft 23 carrying a plough share 24. Means are provided to adjust the ploughing angle of said plough share, said means comprising an arm 25 secured to shaft 23 outside bracket 22 and carrying a set screw 26 contacting with an abutment 27 on bracket 22. By adjusting said screw 26 the angle of inclination of the plough share in relation to the ground may be adjusted at will.

Mounted for travel in a vertical plane transversely of the machine is an endless conveyor 30 passing with a lower run below and behind the plough share 24 and with an upper run above said share. This conveyor may be of any suitable type and is shown in the drawing as composed of two parallel endless sprocket chains 31, 32 and transverse bars 33 fixed to said chains in spaced relation so as to form openings between them. The conveyor 30 is carried around a driving roller 34 on a shaft 35 journalled on the cross beam 14 and in a bracket 36 secured to the side beam 10, said roller having lateral sprocket wheels 37 (Fig. 2) engaging the chains 31, 32. An idle roller 38 mounted at the lower end of arms 40 extending downwardly from the side beam 10, another idle roller 41 mounted at the lower end of similar arms 42 extending downwardly from the side beam 11 and a third idle roller 43 mounted at the outer end of the beams 15, 16 serve to guide the conveyor 30. The rollers 38 and 43 may also be provided with lateral sprocket wheels as shown in Fig. 2.

The driving roller 34 is driven from the rear shaft 20 in the following manner. Secured to said shaft 20 is a gear 45, and meshing with said gear is a gear 46 secured to an intermediate shaft 47 mounted on the side beams 10, 11. At its rear end the shaft 35 of the driving roller 34 carries a bevel gear 48 meshing with a bevel gear 49 on a shaft 50 mounted in a bracket (not shown) secured to the side beam 10. Secured to the shaft 50 is a gear 51 engaging the gear 46 on the intermediate shaft 47 by means of intermediate gears 52, 53 each mounted in a bracket 54 and 55, respectively, secured to the side beam 10.

The elements so far described do not materially differ either in construction or arrangement from those ordinarily found in machines of this type and in themselves form no part of the present invention.

The improved mechanism for gripping the foliage of the potato stands comprises two endless chains 60 arranged collaterally with each other in a plane slanting forwardly of the machine. The chains 60 are situated above the lower run of the conveyor 30 and below the upper run thereof, and their inner runs engage each other along a line in vertical alignment with the central line of the plough share 24 having their fore end situated at a point above and in front of said share.

Each of the chains 60 passes around a fore sprocket wheel 62 secured to a shaft 63 journalled in an arm 64 extending downwardly from the cross beam 14, and around a rear sprocket wheel 65 secured to a shaft 66 journalled in an arm 67 extending downwardly from the cross beam 13. The sprocket wheels 65 are each driven from the intermediate shaft 47 by a bevel gear 68 secured to said shaft and meshing with a bevel gear 69 secured at the upper end of shaft 66.

In order to secure a firm engagement of the chains 60 with the foliage of the potato said chains are designed and arranged in a special manner (see especially Figs. 4 and 5). Each chain is composed of links each comprising two side plates 70 and 71 of substantially rectangular shape and connected with each other by two cross members fixed each at a corner of a longitudinal side of the plate, for instance by being jolted at their ends. For every second link in which the distance between the side plates is somewhat greater than in the other links the cross members consist of sleeves 72, and for every second link said cross members consist of bolts 73 each inserted into a sleeve of the two adjacent links. In this manner each chain will be provided with two longitudinal lists or ribs the one formed by the side plates 70 and the other by the side plates 71 and projecting along the borders of the chains. In assembled position of the chains the plates of each list overlap each other with end portions of such a length that the lists will be unbroken also when the chains run around a sprocket wheel. The shafts 63, 66 of the pairs of sprocket wheels 62 and 65 are arranged at such a distance from each other in the plane of the chains as to cause a list of one of the chains to engage the space between the lists of the other chain, as clearly shown in Fig. 2.

In operation the machine is drawn through a field and over a row of potatoes in the direction of the arrow $a$, Fig. 1, causing movement of the conveyor 30 in the direction of the arrow $b$, Fig. 2, and of the foliage gripping chains 60 in the direction of the arrows $c$, Fig. 1. As mentioned above, the chains 60 have their fore end situated above and in front of the plough share 24 so as to cause the foliage of the potato to be gripped by the chains before the share 24 ploughs up the potato stand. When a potato stand enters the foremost end of the chains 60 designated by $x$ in Fig. 1 the foliage is caught by the inner opposing runs of the chains, and on account of the offset relation of the lists 70, 71 of the chains the foliage is bent into zigzag shape and partly broken so as to cause the foliage to be effectively gripped and retained in clamped position. When the foliage of a potato stand has been gripped by the chains the plough share 24 loosens the earth around the potatoes, the foliage together with the potatoes being pulled out of the ground as the chains move obliquely upwards. On the continued movement of the chains the potato stand is stripped of its potatoes by the shaft 23, the potatoes falling onto the conveyor 30 which carries the potatoes to any suitable collecting device (not shown), the soil accompanying the potatoes falling onto the ground through the openings of the conveyor. The foliage deprived of its potatoes is carried along by the chains 60 and leaves the machine at the rearmost end of the chains.

Machines of this kind previously known do not ensure an effective and firm engagement of the pulling and elevating mechanism with foliages in different stages of development. A thin foliage has the tendency of sliding vertically downwards between the gripping members under the action of the weight of the potatoes and the soil adhering thereto so that the stand is left in the ground, and a thick foliage often causes stopping of the machine, or it is cut off from the potatoes which are left in the ground. The improved pulling and elevating mechanism according to the invention ensures a safe gripping of the foliage by the interengaging lists of the chains, irrespective of the more or less developed state of the foliage so that the potatoes are safely pulled out of the ground and moved onto the conveyor also in case of excessively thin foliages. Thick foliages do not cause stopping of the machine as the chains permit a lateral expansion without their gripping action being lost.

It should be observed that in the following claims the expression "chain" should be expounded in its widest sense, it being within the scope of the invention instead of chains to use other endless members such as bands, ropes and the like. Further, although on the drawing only one pair of pulling and elevating chains is shown, it is also within the scope of the invention to use a plurality of pairs of interengaging chains. Further, a plurality of shafts 23 may be used for stripping the stand of its potatoes.

What I claim is:

1. In a machine for harvesting vegetables, a pulling and elevating mechanism comprising a pair of flexible endless chains arranged side by side in a plane slanting forwardly of the machine and opposing each other along a portion of their length, each of said chains being composed of pivotally interconnected links each comprising a plurality of substantially rectangular shaped plates projecting in spaced parallel relation from the opposing surface of the chain and connected with each other by two cross members fixed each at a corner of a longitudinal side of the plate, the cross members of each second link including sleeves in each of which one cross member of the two adjacent links are inserted, said links forming with each other a corresponding number of lists extending substantially longitudinally of the chain, means to support the chains in such position with respect to each other as to cause the lists of one of the chains to be offset in relation to those of the other chain and lists of one of the chains to project into the space between lists of the other chain, whereby the foliage of the vegetable is bent into zigzag shape between the lists and effectively gripped by the chains, and means to drive said chains.

2. In a machine for harvesting vegetables, a pulling and elevating mechanism comprising a pair of flexible endless chains arranged side by side in a plane slanting forwardly of the machine and opposing each other along a portion of their length, each of said chains being composed of pivotally interconnected links each comprising a plurality of substantially rectangular shaped plates projecting in spaced parallel relation from the opposing surface of the chain and rigidly interconnected with each other by two cross members fixed each at a corner of a longitudinal side of the plate, the cross members of each second link including sleeves in each of which one cross member of the two adjacent links are inserted, said chains forming with each other a corresponding number of lists of overlapping plates extending substantially longitudinally of the chain, means to support the chains in such position with respect to each other as to cause the lists of one of the chains to be offset in relation to those of the other chain and lists of one of the chains to project into the space between lists of the other chain, whereby the foliage of the vegetable is bent into zigzag shape between the lists and effectively gripped by the chains, and means to drive said chains.

PER ANTON NILSSON.